July 20, 1965 E. HOPNER ETAL 3,196,352

MULTILEVEL VESTIGIAL SIDEBAND SUPPRESSED CARRIER DATA TRANSMISSION SYSTEM

Filed Dec. 18, 1962 3 Sheets-Sheet 1

INVENTORS
EMIL HOPNER
DALE L. CRITCHLOW
ROBERT H. DENNARD

BY John J. Goodwin

ATTORNEY

July 20, 1965 E. HOPNER ETAL 3,196,352

MULTILEVEL VESTIGIAL SIDEBAND SUPPRESSED CARRIER DATA TRANSMISSION SYSTEM

Filed Dec. 18, 1962 3 Sheets-Sheet 3

United States Patent Office 3,196,352

Patented July 20, 1965

3,196,352

MULTILEVEL VESTIGIAL SIDEBAND SUPPRESSED CARRIER DATA TRANSMISSION SYSTEM

Emil Hopner, Yorktown Heights, Dale L. Critchlow, Lincolndale, and Robert H. Dennard, Croton-on-Hudson, N.Y., assignors to International Business Machines Corporation, New York, N.Y., a corporation of New York Filed Dec. 18, 1962, Ser. No. 245,455
6 Claims. (Cl. 325—49)

The present invention relates to an improved data transmission system and more particularly to a multilevel vestigial sideband suppressed carrier data transmission system for high speed transmission of information.

In data transmission systems, and in particular systems for transmitting coded information, the features which are primarily desired are high speed, reliability, and simplicity.

It is an object of the present invention to provide a reliable data transmission system incorporating techniques for permitting high speed data transmission with relatively simple circuitry.

Another object of the present invention is to provide a data transmission system including a unique and simple combination of components and subsystems which permits the achieving of the highest speeds on telephone lines and other broadband circuits heretofore known and therefore the highest efficiency.

Still another object of the present invention is to provide a data transmission system which overcomes carrier ambiguity.

A further object of the present invention is to provide a data transmission system employing multilevel encoding.

Another object of the present invention is to provide a data transmission system including gain control for providing optimum threshold levels for detection.

Still another object of the present invention is to provide a data transmission system employing novel clocking techniques.

The foregoing and other objects, features and advantages of the invention will be apparent from the following more particular description of preferred embodiments of the invention, as illustrated in the accompanying drawings.

Figure 1:
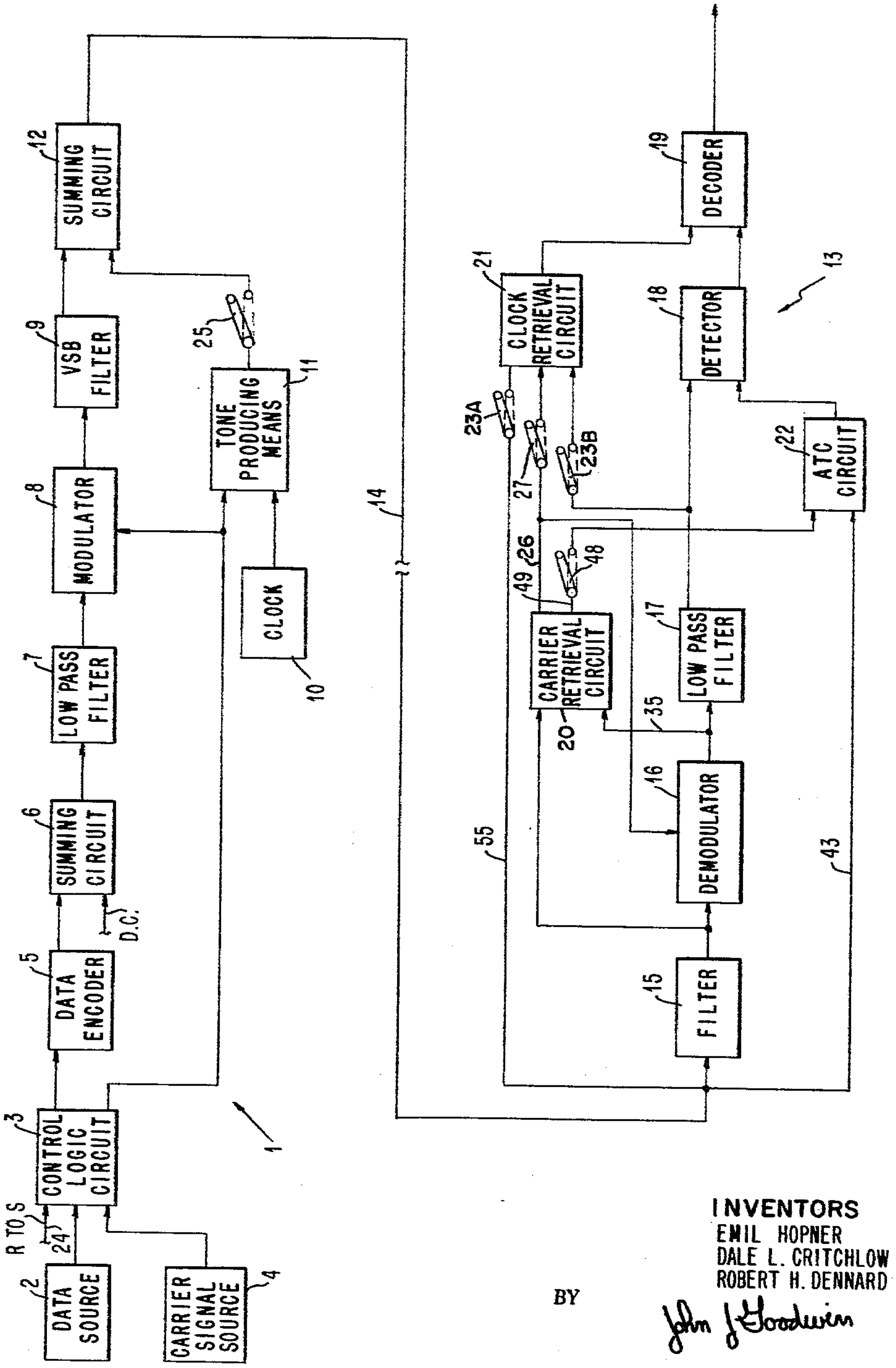
FIG. 1 is a system block diagram of a data transmission system following the principles of the present invention.

Referring to FIG. 1, a suppressed carrier vestigial sideband data transmission system is shown including a transmitter 1 having a data source 2, a control logic circuit 3, a source of carrier signal 4, a data encoder 5, a summing circuit 6, a low-pass filter 7, a modulator 8, a vestigial sideband filter (VSB) 9, a clock circuit 10, a tone producing means 11 and a summing circuit 12. Tone producing means 11 may be connected to summing circuit 12 via switch 25 for certain operating conditions.

Transmitter 1 is electrically connected to a receiver 13 via a suitable transmission medium, for example, transmission line 14. Receiver 13 includes a filter 15, a demodulator 16, a low-pass filter 17, a threshold detector 18, a decoder 19, a carrier retrieval circuit 20, a clock retrieval circuit 21 and an automatic threshold control circuit 22. Switches 23A, 23B, 27 and 48 are included to provide for the selection of different modes of operation for added system versatility.

The basic operation of the system of FIG. 1 is that the data signal from source 2 is encoded into a binary or multilevel data signal, for example, four level etc., by data encoder 5 after passing through control logic circuit 3. Control logic circuit 3 clamps the data signal from source 2 and the carrier signal from carrier source 4 when the signal on "request to send" lead 24 is "down" and removes the carrier signal clamping for an interval determined by a single shot trigger included thereinafter the reception of a "request to send" signal on lead 24. During the predetermined interval before sending the message data, the carrier signal is transmitted to the receiver in a phase determined by the polarity at which the data state is clamped. Circuitry at the receiver uses this information to establish the desired phase in the carrier retrieval circuit used for synchronous demodulation. The phase correcting circuits will be later more fully described in the section designated "Phase Correction Mode."

The encoded data signals (binary or multilevel) are applied to summing circuit 6 where a D.C. level is added thereto. The addition of the D.C. level is to insure that a carrier component will be present in the transmitted signal to enable carrier retrieval for synchronous demodulation at the receiver. The addition of a D.C. signal to the data signal to provide a carrier component in the transmitted signal is fully discussed in co-pending application Serial No. 245,500, entitled "Vestigial Sideband Transmission System," filed December 18, 1962, by D. L. Critchlow et al., and assigned to the present assignee. The encoded data signal is then low-pass filtered and applied to balanced modulator 8 where it is multiplied with the carrier signal from carrier source 4 (transmitted unchanged through control logic circuit 3). Modulator 8 is also referred to in the art as a product modulator. The modulated signal from modulator 8 is then passed through vestigial sideband (VSB) filter 9 which is typically a low-pass filter which effectively removes a large portion (up to 85%) of the upper sideband of the modulated signal. The output signal from VSB filter 9 is passed through summing circuit 12 where it may be summed with the output from tone producing means 11 through switch 25. Switch 25 will be closed for the continuous tone mode of operation later described in the section entitled "Tone Transmission for AGC" and "Tone Transmission for Clock Retrieval." The output from summing circuit 12 is transmitted to receiver 13 via transmission line 14 which may introduce a small frequency translation of the transmitted signal components. At receiver 13 the transmitted signal is passed through filter 15 which removes noise and, in the continuous tone mode of operation later described, also filters out the tone signal. The output signal from filter 15 is applied to carrier retrieval circuit 20 and demodulator 16. Carrier retrieval circuit 20 reconstructs the carrier in proper frequency and phase and applies it to demodulator 16 via lead 26 for synchronous demodulation. Carrier retrieval circuit 20 also contains phase ambiguity correction circuitry to be later described and shown more fully in FIG. 3. The demodulated signal from demodulator 16 is passed through a low-pass filter 17 to threshold detector 18. Threshold detector 18 contains established threshold levels such that the levels of the demodulated signals with respect to the threshold levels determine separate species of information. Threshold detector 18 is also coupled to the output of automatic threshold control circuit 22, which, in response to tones transmitted in the line 14, vary the levels in threshold detector 18 in accordance with gain changes in the transmission medium 14. This feature will be discussed in the section designated "Tone Transmission for AGC." The output signal from threshold detector 18 is passed through decoder 19 which decodes the signal and provides a meaningful data output signal.

The clock retrieval circuit 21 provides a data clock signal to decoder 19. Clock retrieval circuit 21 derives the data clock in the "continuous tone mode" to be later described in the section entitled "Tone Transmission for Clock Retrieval." In the event that continuous tone operation is employed switches 23A and 27 are closed and switch 23 is open and clock retrieval circuit 21 is connected to line 14 and carrier retrieval circuit 20. When an alternate clock retrieval circuit is employed (to be later identified), switch 23B is closed and switches 23A and 27 are open and clock retrieval circuit 21 is connected to the output of low-pass filter 17. Having described the basic transmission system of FIG. 1, the various modes of operation will be discussed with the specific circuitry associated with each mode described in greater detail.

PHASE CORRECTION MODE

Figure 2:
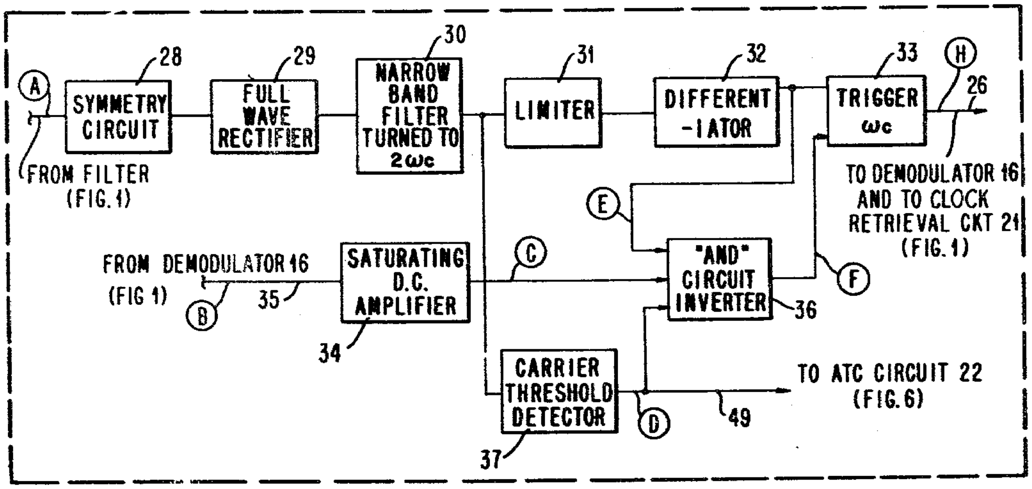
FIG. 2 is a block diagram of the carrier retrieval circuit employed in the system of FIG. 1.

Referring to FIG. 2, a detailed block diagram of carrier retrieval circuit 20 is shown. The transmitted VSB signal (after being passed through filter 15) is applied to symmetry circuit 28. Symmetry circuit 28 is a filter having a characteristic which is the complement of the VSB filter 9 and filter 15 of FIG. 1 to provide an output which is a double sideband signal symmetrical about the frequency of the carrier and containing either a pair of component frequencies or a carrier term produced as a result of a low frequency component or a D.C. level in the data signal from summing circuit 6 (FIG. 1). A symmetry circuit similar to circuit 28 is fully described in previously mentioned co-pending application Serial No. 245,500. The output signal from symmetry circuit 28 is full wave rectified by circuit 29 to provide for the fact that the carrier signal reverses in phase when the modulating signal changes in polarity. The full wave rectifier 29 removes the phase reversals and produces an output signal having a component at twice the carrier frequency. The full wave rectified signal from circuit 29 is passed through narrow band filter 30, which may be a tuned circuit which is tuned to $2\omega_c$ to provide an output signal at twice the carrier frequency (i.e., $2\omega_c$). The output signal from narrow band filter 30 is applied to liimter circuit 31 which removes the amplitude variation of the $2\omega_c$ waveform by amplifying the A.-C. coupled signal about the zero crossing level. The output signal from limiter circuit 31, which is approximately a square wave, is then passed through an R.C. differentiating circuit 32 to form positive and negative pulses. The positive pulses from differentiating circuit 32 are then applied to trigger circuit 33 which effectively frequency divides the $2\omega_c$ waveform and provides a carrier frequency signal which is applied to demodulator 16 (FIG. 1) via lead 26 for synchronous demodulation of the transmitted VSB signal. An important consideration of the retrieval circuit thus far described is that the trigger circuit 33 has two output states or phases. It is necessary that the output state of trigger 33 agree with the desired state of the data signal. In general, if trigger 33 is not started in the proper phase, the output data waveform from demodulator 16 and low-pass filter 17 will be inverted. Thus, it is necessary to have circuitry which will establish the proper state of trigger 33. Such circuitry includes a saturating D.C. amplifier 34 coupled to the output of demodulator 16 (FIG. 1) via lead 35. The output of the saturating D.C. amplifier is coupled to one input of an inverting "AND" gate 36. A carrier threshold detector 37 is coupled to the output of narrow band filter 30 and provides an output signal after a fixed time delay of at least several cycles after the output signal from narrow band filter 30 has built up to a predetermined amplitude in the initial interval of transmission corresponding to a "request to send" signal at the transmitter. This delay signal (achieved by rectifying and filtering the limiter output) permits a phase correction pulse to establish the proper state of trigger 33. Carrier threshold detector 37 includes a full-wave rectifier, a low-pass filter and a level detection network which changes state at a given amplitude of the output signal of the low-pass filter. It was previously stated that for a predetermined time period after a "request to send" signal is applied to lead 24 (FIG. 1) the carrier signal is transmitted at the data state prior to transmission of data. This carrier signal is received and demodulated by demodulator 16 (FIG. 1) and applied through saturating D.C. amplifier 34 to "AND" gate 36, indicating the polarity of the demodulator output. The output signal from carrier threshold detector 37 (indicating that the receiver is in the starting position) and the output signal from differentiator 32 are also applied to "AND" gate 36. Thus, when trigger 33 starts in the wrong phase, a correction pulse is applied thereto to change the phase via the negative pulse output from differentiator output 32 gated by the signals from carrier threshold detector 37 and demodulator 16 (FIG. 1) through saturating D.C. amplifier 34. The correction pulse changes the polarity of the demodulator 16 output at the times when subsequent negative pulses occur, blocking the "AND" gate 36 to prevent additional pulses. Carrier threshold detector 37 clamps the "AND" gate 36 at the end of the correction interval so that correction pulses will not be generated when the input to demodulator 16 changes during data transmission. Diodes included in trigger circuit 33 decouple the two inputs such that the positive pulse present on either input will change the state of trigger 33.

Figure 3:
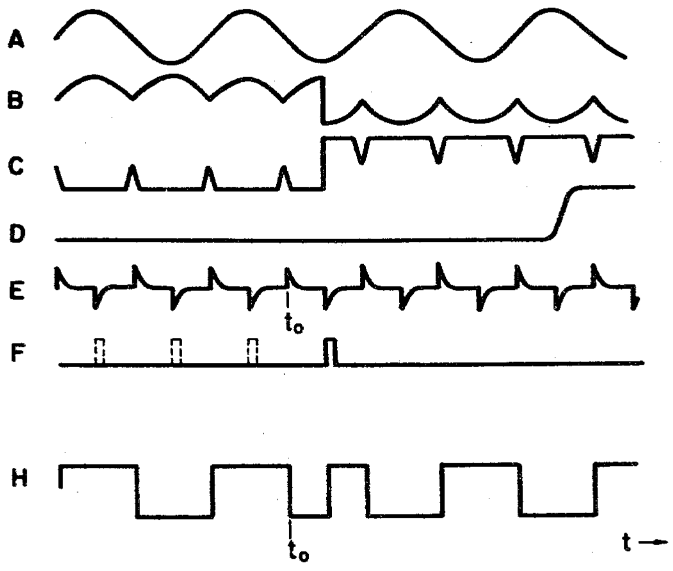
FIG. 3 is an illustration of waveforms useful in explaining the operation of FIG. 2.

The operation of the circuit of FIG. 2 may be more clearly understood by referring to the waveforms of FIG. 3 which are associated with the reference letters shown on FIG. 2. For purposes of illustration, the waveforms prior to transmitting the data message are shown assuming that the output lead from "AND" gate 36 is held open until time $t_0$. When waveforms C and D are both in the down level, the negative pulse E is gated through "AND" gate 36, resulting in a positive pulse F. As seen by the waveforms subsequent to $t_0$, the correction pulse (F) immediately changes the state of trigger 33 to give the desired (e.g., negative) output from demodulator 16.

TONE TRANSMISSION FOR AGC

It was previously stated in the description of FIG. 1 that the data signals from data source 2 may be encoded by data encoder 5 into binary or multilevel code. Binary coding is well known and presents no unusual difficulties; however, when multilevel coding is employed, it becomes necessary to more accurately control the threshold levels of the detection circuits in the receiver. The controlling of the threshold levels will be referred to herein as automatic gain control and will be illustrated in association with four level coding in particular, but it is to be understood that the principles to be described may be utilized with any multilevel coding in general.

Four level coding is a method of data transmission wherein the transmission rate of a system is increased significantly by using four input levels to contain the information to be transmitted. Each input level corresponds to two bits of information which may come from two separate data channels, or could be alternate bits of a stream of data at the over-all transmission rate.

One particular scheme for four level encoding may be shown as follows:

*Table I*

| Bit A | Bit B | Voltage Level |
|---|---|---|
| 1 | 1 | +V |
| 1 | 0 | $\frac{+V}{3}$ |
| 0 | 0 | $\frac{-V}{3}$ |
| 0 | 1 | −V |

It is seen that the four levels are equally spaced and that bit A determines the polarity of the voltage level and bit B determines the amplitude of the voltage level. It is well known that data encoder 5 can be designed to provide four level encoding in response to two binary signals as described in Table I and the details will not be discussed herein.

The advantage of this type encoding is that there is only a change of one of the binary values between adjacent voltage levels; this helps to prevent double errors which are not easily detected by parity checking schemes.

The use of four level encoding however, requires that the detection circuits in the receiver provide threshold levels which effectively separate the four voltage levels of the code. For example, in the present case the detection circuits must provide three threshold levels; the first level being set at $$\frac{2V}{3}$$

so that signals above the threshold level will be recognized as $+V(1,1,)$. The second threshold level is set at $V=0$ so that signals above such level (and below the first threshold level) will be recognized as $$\frac{+V}{3}(1, 0,)$$

The third threshold level is set at $$\frac{-2V}{3}$$

so that signals above such level (and below the second level) will be recognized as $$\frac{-V}{3}(0, 0,)$$

and signals below such level will be recognized as $-V(0, 1,)$. If the three threshold levels are exclusively maintained at the $$\frac{+2V}{3}$$

zero, and $$\frac{2V}{3}$$

levels, it is quite possible that, because of signal amplitude variations during transmission, there will be erroneous outputs produced. A feature of the present system is that the levels of the thresholds are varied by an automatic gain control device in accordance with the variations which occur in the data signal transmitted through the line. Thus, as the levels of the data signal raise and lower, the threshold levels in the receiver will similarly be raised and lowered to prevent erroneous detection.

It is recognized that in practice the data levels are modified from the idealized levels described here by the addition of a relatively small D.-C. term at summing circuit 6 of FIG. 1 and are received at levels proportional to those modified levels with the use of the circuits described in the "Phase Correction Mode" preventing polarity inversion in the received signal. The nominal threshold levels are correspondingly modified in magnitude to provide optimum threshold detection. This does not affect the accuracy of the automatic variation of the threshold levels to compensate for gain changes.

Figure 4:
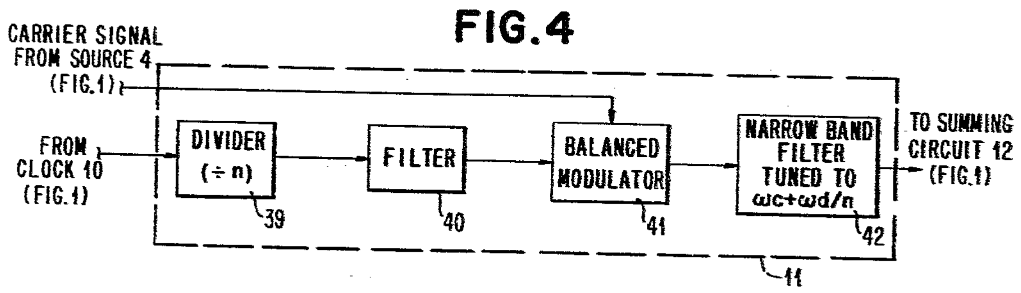
FIG. 4 is a block diagram of the tone producing means employed in the system of FIG. 1.

The automatic controlling of the gain of the threshold levels may be accomplished in either of two modes, designated herein as the "continuous tone mode" and the "periodic tone mode." In the continuous tone mode a low level tone is transmitted at a frequency just outside the normal VSB transmission spectrum. This tone is produced by tone producing means 11 (FIG. 1) and is added to the transmitted signal by the closing of switch 25. Tone producing means 11 is shown in more detail in FIG. 4. Referring to FIG. 4, tone producing means 11 is shown including a divider circuit 39 which is responsive to the clock signal from clock 10 (FIG. 1) and divides the clock signal by an integer $n$. This results in a square wave signal having a frequency referred to as $$\frac{\omega_d}{n}$$

where $\omega_d$ is the clock frequency. The output from divider circuit 39 is passed through filter 40 to prevent unwanted modulation products. The signal is then applied to balanced (product) modulator 41 where it is multiplied by the carrier signal $\omega_c$ from carrier source 4 to produce an upper sideband term at frequency $$\omega_c+\frac{\omega_d}{n}$$

which is separated in a tuned bandpass circuit 42. Thus, a tone signal lying outside the transmitted spectrum is added to the transmitted signal at summing circuit 12 (FIG. 1). More particularly, the tone signal has a frequency $$\omega_c+\frac{\omega_d}{n}$$

which is not significant in the present discussion of the control of the detector threshold levels, but the importance of which will be seen in a later section when the utilization of this tone for clock retrieval is discussed.

Figure 5:
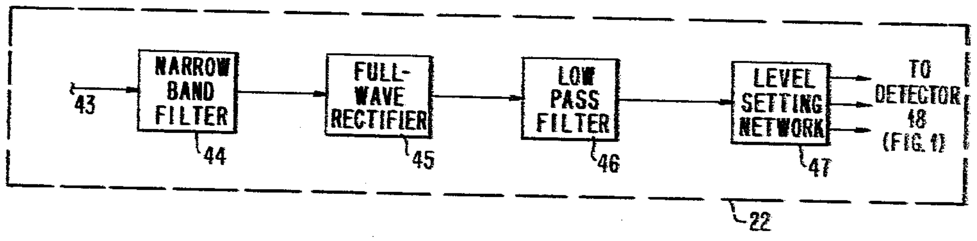
FIG. 5 is one embodiment of an automatic threshold control circuit employed in the embodiment of FIG. 1.

The tone signal is continuous, and is transmitted to the receiver. During transmission the tone signal will experience the same amplitude variations due to line conditions as the encoded signal. At the receiver the transmitted signal, including the continuous tone signal, is applied to automatic threshold control circuit 22 via lead 43. In the continuous mode, switch 48 (FIG. 1) is open and circuit 22 is disconnected from carrier retrieval circuit 20. Automatic threshold control circuit 22 for the continuous tone mode is shown in more detail in FIG. 5. The transmitted signal is applied to narrow band filter 44 which is tuned to $$\omega_c+\frac{\omega_d}{n}$$

(the tone frequency). The tone frequency signal therefrom is passed through full-wave rectifier 45. The output signal from full-wave rectifier 45 is passed through low-pass filter 46 to level setting network 47. Low-pass filter 46 averages the rectified tone over a time period (to avoid interference) which provides the rectified average power of the tone which is a positive signal which varies in accordance with the signal variations due to gain changes in the system. Level setting network 47 is a resistor network which has its output (which may include more than one output lead) coupled to threshold detector 18 (FIG. 1). Level setting network 47 provides an amplified or attenuated output signal to adjust the threshold levels of threshold detector 18 in proportion to the increase or decrease in system gain. Since threshold detector 18 includes a negative threshold nominally $$\frac{-2V}{3}$$

level setting network 47 includes an inverter to adjust the negative threshold inversely.

The other method of threshold control is the "periodic tone mode." In such mode, the tone producing means 11 at the transmitter is not employed and switch 25 is opened. The tone which is employed instead is the previously described carrier signal which is transmitted to the receiver at a phase and amplitude determined by a given data signal level. This carrier signal is produced by control logic circuit 3 and was described in association with the "Phase Correction Mode" section hereinabove. It was stated that this carrier signal modulated by the fixed data state was produced for a predetermined interval before the sending of each message. Thus, it may be considered a periodic tone signal which precedes the transmission of each message and is transmitted to the receiver and includes the system gain changes.

Figure 6:
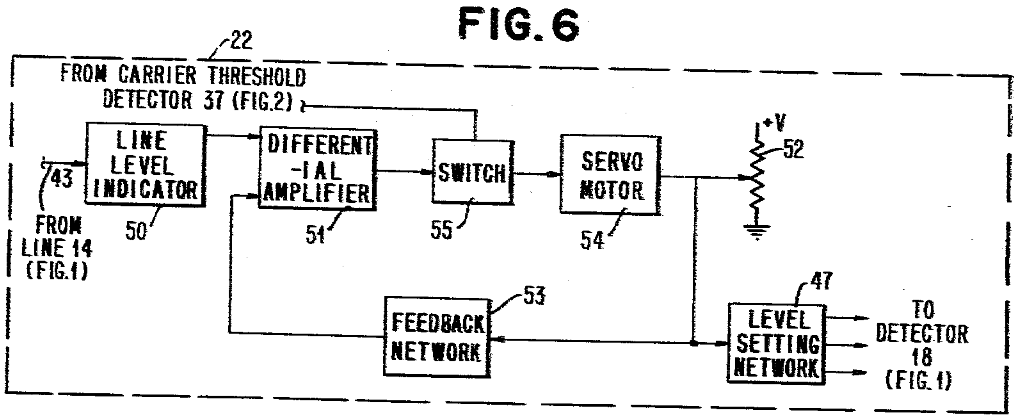
FIG. 6 is another embodiment of an automatic threshold control circuit employed in the embodiment of FIG. 1.

At the receiver, the automatic threshold control circuit 22 is modified to appear as shown in FIG. 6. In the periodic mode, switch 48 (FIG. 1) is closed and circuit 22 is connected to carrier threshold detector 37 in retrieval circuit 20 (FIG. 2) via lead 49. The transmitted signal on line 43 is applied to a line level indicator 50. Line level indicator 50 converts the level of the A.C. transmitted signal to a proportional D.C. level and may include, for example, a full-wave rectifier and a filter. The D.C. signal (proportional to the level of the transmitted signal) is applied to one input of differential amplifier 51. The other input to differential amplifier 51 is obtained from potentiometer 52 via feedback network 53. Feedback network 53 is conventional and serves to stabilize the circuit. If any difference voltage is present between the D.C. line level signal from indicator 50 and feedback signal from potentiometer 52, the difference signal is transmitted to servo motor 54 when switch 55 is closed. Servomotor 54 operates in response to the difference signal to drive potentiometer 52 to a setting which will result in a zero difference signal. Thus, a constant D.C. signal is applied to level setting network 47 (previously described in relation to FIG. 5) to provide the proper adjustments of the threshold levels in threshold detector 18 (FIG. 1). It is desired that switch 55 be closed only during the time interval when the carrier signal at the fixed data state is transmitted, and be open when the message is transmitted. To accomplish this, switch 55 is electronically actuated by carrier threshold detector 37 of FIG. 2 which as previously described is designed to produce a given output state (which will open the switch) at a predetermined time after the beginning of reception of each new message near the end of the period of reception of the constant amplitude carrier signal. After switch 55 is opened, servo-motor 54 is de-energized and potentiometer 52 remains in the same position until the end of the message. Thus the detector thresholds are set at levels proportional to the gain in the transmission medium 14 at the beginning of a given message.

TONE TRANSMISSION FOR CLOCK RETRIEVAL

For either binary or multilevel coded data transmission, the continuous tone produced by tone producing means 11 (FIG. 1) may also be used to transmit clock information for clock retrieval at the receiver. It was previously described in the "Tone Transmission for AGC" section that tone producing means 11 adds a signal to the transmitted signal outside the transmitted spectrum at a frequency $$\omega_c+\frac{\omega_c}{n}$$

Figure 7:
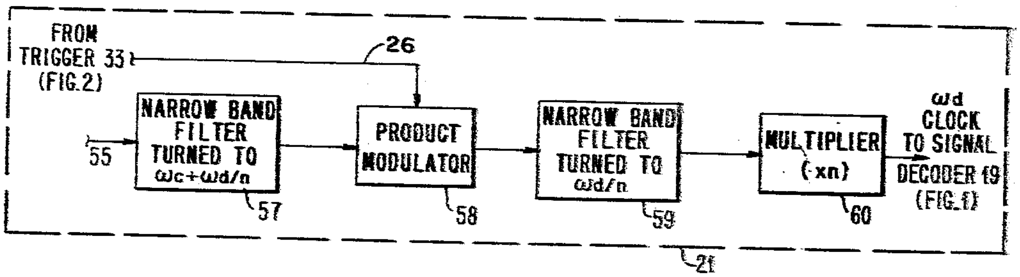
FIG. 7 is an embodiment of a clock retrieval circuit employed in FIG. 1.

At the receiver, the transmitted signal (including the tone signal) is applied to clock retrieval circuit 21 via lead 55 through closed switch 23A. Clock retrieval circuit 21 is shown in detail in FIG. 7. In FIG. 7, the transmitted signal including the tone signal is applied to narrow band filter 57 which passes the tone signal frequency $$\omega_c+\frac{\omega_d}{n}$$

to product modulator 58 where it is multiplied by the retrieved carrier signal $\omega_c$ from trigger 33 (FIG. 2) on lead 26 through closed switch 27. The output signal from product modulator 58 is the difference frequency $$\frac{\omega_d}{n}$$

The difference frequency $$\frac{\omega_d}{n}$$

from product modulator 58 is separated from other modulation products by narrow-band filter 59 which is tuned to $$\frac{\omega_d}{n}$$

The signal from filter 59 is multiplied by the integer $n$ (described in relation to FIG. 4) at multiplier 60 to provide an output signal of $\omega_d$ frequency, which is the clock frequency. The clock output signal from multiplier 60 is then applied to decoder 19 (FIG. 1) to allow a retimed data output signal.

An alternate embodiment of the clock retrieval circuit 21 is shown in co-pending application Serial No. 245,544 filed December 18, 1962, and entitled "Transmission Systems," and assigned to the same assignee as the present invention. The clock retrieval circuit described in that application may be employed in the present system. The signal from which the clock is derived in the co-pending application is a function of the changes of magnitude of the data signal that may occur at each digit interval. To employ the clock retrieval circuit of the co-pending application, the input signal clock retrieval circuit is taken from the output of low-pass filter 17 (FIG. 1). Thus, if such clock retrieval circuit is employed, switches 23A and 27 are opened and switch 23B is closed.

What has been described is a novel data transmission system for transmitted binary or multilevel coded data at high speed. The system incorporates circuitry which overcomes carrier ambiguity by providing a phase correction signal; by the transmission of a periodic signal which controls the threshold level of the receiver detector by the transmission of a continuous tone or by the above-mentioned periodic signal used for providing the phase correction signal; and which further provides for clock retrieval at the receiver by employing the above-mentioned continuous tone used for level control, or by employing a signal produced by the changes in magnitude of the data signal.

While the invention has been particularly shown and described with reference to preferred embodiments thereof, it will be understood by those skilled in the art that various changes in form and details may be made therein without departing from the spirit and scope of the invention.

What is claimed is:

1. A partially suppressed carrier data transmission system comprising in combination: a transmitter for transmitting coded information signals and a receiver electrically connected to said transmitter by a suitable transmission medium, said transmitter including a source of data signals, a source of clock signal, a source of carrier signal, means for modulating said carrier signal with said data signal for producing transmitted signals, means coupled to said source of data signals and said source of carrier signal for adding to said transmitted signals, a periodic signal consisting of said carrier signal having a fixed data signal level added thereto, means coupled to said source of carrier signal and said source of clock signal for multiplying the carrier signal and the clock signal therefrom and for adding to said transmitted signals, a continuous signal consisting of a component of the product of said clock signal and said carrier signal having a frequency greater than the spectrum of said transmitted signals, said receiver including a carrier retrieval circuit responsive to said transmitted signals for detecting said carrier signal, a demodulator connected to said carrier retrieval circuit and responsive to said transmitted signals for demodulating said transmitted signals, a detector coupled to the output of said demodulator, and a decoder coupled to the output of said detector for producing output data signals, phase correcting means coupled to said carrier retrieval circuit and said demodulator and responsive to said periodic signal added to said transmitted signal for providing a phase correcting pulse to said carrier retrieval circuit for establishing the proper initial phase for the output signal from said carrier retrieval circuit, a clock retrieval circuit coupled to said decoder and responsive to said continuous signal added to said transmitted signal for providing a clock signal to said decoder for producing decoded output data signals, and an automatic threshold control circuit coupled to said detector and selectively responsive to said periodic and continuous signals for providing a signal to said detector for varying the threshold levels thereof in accordance with variations of said periodic and continuous signals due to transmission.

2. A partially suppressed carrier data transmission system according to claim 1 wherein said means for adding a continuous signal to said transmitted signal includes a divider circuit responsive to said clock signal for dividing said clock signal by a predetermined amount, a filter coupled to said divider circuit for filtering undesired components of said divided clock signal, modulating means coupled to said filter and response to said carrier signal for modulating said carrier signal with the output signal from said filter, and a narrow band filter coupled to the output of said modulation for removing undesired modulation components from the modulated output signal therefrom and providing an output signal having a frequency proportioned to said clock signal.

3. A partially suppressed carrier data transmission system according to claim 1 wherein said carrier retrieval circuit includes a symmetry circuit responsive to said transmitted signal for providing a double sideband output signal symmetrical about the frequency of said carrier signal and containing a pair of component frequencies of said data signal, a full wave rectifier coupled to said symmetry circuit and responsive to said double sidebank signal, a narrow band filter coupled to said full wave rectifier to provide an output signal at twice the carrier frequency, a limiter circuit coupled to said narrow band filter to provide a relatively square wave output signal at twice the carrier frequency, a differentiating circuit coupled to the output of said limiter circuit to provide an output signal consisting of a plurality of positive pulses on response to positive going transitions of said relatively square wave signal from said limiter circuit, and a trigger circuit responsive to the positive pulses from said differentiating circuit to produce an output signal at the carrier frequency, and wherein said phase correcting means includes a saturating D.C. amplifier coupled to said demodulator for producing an output signal representative of the phase of the output signal from said demodulator, a carrier threshold detector coupled to the output of said narrow band filter for producing an output signal representative of the level of the output signal from said narrow band filter and delayed in time a predetermined amount, and a logical "AND" circuit coupled to the outputs of said saturating D.C. amplifier, said carrier threshold detector, and said limiter circuit for applying a positive output pulse to said trigger when said output signal from said D.C. amplifier, said carrier threshold circuit, and said limiter circuit are simultaneously in a negative state.

4. A partially suppressed carrier data transmission system according to claim 1 wherein said clock retrieval circuit includes a narrow band filter responsive to said transmitted signal for passing said signal consisting of a component of the product of said clock signal and said carrier signal having a frequency greater than the spectrum of said transmitted signals, a modulator responsive to the signal from said narrow band filter and said carrier signal from said carrier retrieval means for providing an output signal proportional to said clock signal, and a multiplier circuit coupled to the output of said modulator for multiplying the proportional signal therefrom for providing an output signal at clock frequency.

5. A partially suppressed carrier data transmission system according to claim 1 wherein said automatic threshold control circuit includes a narrow band filter responsive to said transmitted signal for passing said continuous signal added thereto, a full wave rectifier responsive to said continuous signal from said filter for providing an output signal proportioned to the rectified average power of the continuous signal, and a level setting circuit responsive to said rectified average power signal for applying a threshold control signal to said detector for adjusting of the threshold values of said detector in accordance with gain variations in said system.

6. A partially suppressed carrier data transmission system according to claim 1 wherein said automatic threshold control circuit includes a line level indicator responsive to said transmitted signal for providing a D.C. output signal having an amplitude proportional to the level of said periodic signal added to said transmitted signal, a potentiometer, a differential amplifier coupled to said potentiometer and said line level indicator for providing an error signal proportional to the difference in amplitude of the signals therefrom, a servo-motor responsive to said error signal for positioning said potentiometer to provide a zero error signal, a level setting network coupled to said potentiometer and responsive to the signal therefrom for applying a threshold control signal to said detector for adjusting the threshold values of said detector in accordance with gain variations in said system, and a switch coupled between said differential amplifier and said servo-motor for applying said error signal to said servo-motor only during the occurrence of said periodic signal.

References Cited by the Examiner

UNITED STATES PATENTS

| | | | |
|---|---|---|---|
| 2,129,020 | 9/38 | Murphy | 325—330 |
| 2,871,295 | 1/59 | Stachiewicz | 325—49 |
| 2,979,610 | 4/61 | Beucher | 325—330 |
| 3,084,328 | 4/63 | Groeneveld et al. | 325—49 |

FOREIGN PATENTS

| | | | |
|---|---|---|---|
| 636,467 | 5/50 | Great Britain. | |

DAVID G. REDINBAUGH, *Primary Examiner.*